(12) United States Patent
Gibbs

(10) Patent No.: US 7,214,112 B2
(45) Date of Patent: May 8, 2007

(54) AMPHIBIOUS VEHICLE

(75) Inventor: Alan Timothy Gibbs, London (GB)

(73) Assignee: Gibbs Technologies Limited (IM)

( * ) Notice: Subject to any disclaimer, the term of this patent is extended or adjusted under 35 U.S.C. 154(b) by 156 days.

(21) Appl. No.: 11/134,953

(22) Filed: May 23, 2005

(65) Prior Publication Data
US 2005/0277342 A1    Dec. 15, 2005

Related U.S. Application Data

(63) Continuation-in-part of application No. 10/362,490, filed as application No. PCT/GB01/03773 on Aug. 23, 2001.

(51) Int. Cl.
*B60F 3/00* (2006.01)
(52) U.S. Cl. ............... 440/12.51; 440/12.59; 440/12.61
(58) Field of Classification Search ............ 440/12.51, 440/12.57, 12.58, 12.6, 12.61
See application file for complete search history.

(56) References Cited

U.S. PATENT DOCUMENTS

| | | | |
|---|---|---|---|
| 2,341,165 A | 2/1944 | Thayer ...................... 440/88 R |
| 2,350,037 A | 5/1944 | Hofheins et al. | |
| 2,618,979 A | 11/1952 | Benning | |
| 3,114,347 A | 12/1963 | Trippel | |
| 3,176,585 A | 4/1965 | Ruf | |
| 3,486,477 A | 12/1969 | Pender | |
| 3,605,962 A | 9/1971 | Maynard | |
| 4,257,505 A | 3/1981 | Stodt ........................... 192/18 |
| 4,579,183 A | 4/1986 | Irikura et al. ............... 180/53.1 |
| 4,852,521 A | 8/1989 | Harrington ................ 119/51.04 |
| 5,236,061 A | 8/1993 | Haupt ......................... 180/254 |
| 5,590,617 A | 1/1997 | Gere et al. ................... 114/270 |
| 5,752,862 A | 5/1998 | Mohler et al. ................ 440/38 |
| 5,832,862 A * | 11/1998 | Hulten ...................... 440/12.5 |
| 6,170,456 B1 | 1/2001 | Gu et al. ..................... 123/196 |

FOREIGN PATENT DOCUMENTS

| | | |
|---|---|---|
| DE | 3916200 A | 11/1990 |
| FR | 1389569 | 6/1965 |

OTHER PUBLICATIONS

United Kingdom Search Report dated Jul. 12, 2001.
International Search Report dated Jun. 12, 2001.

* cited by examiner

Primary Examiner—Jesús D. Sotelo
(74) Attorney, Agent, or Firm—Young Basile

(57) ABSTRACT

An amphibious vehicle has a power train including an engine having an oil sump connected to a lower portion of the engine an in-line transmission and a power take off. The power take off is located between the engine and the transmission thereby separating the engine and the transmission, is driven by the engine crankshaft and drives the transmission; and is adapted to transfer drive to a marine propulsion unit located at the rear of the amphibious vehicle by means of a drive shaft which runs below or through the oil sump of the engine or alongside the engine. The output from the transmission is adapted by a transfer drive to drive a differential located at the rear of the amphibious vehicle; and optionally also to drive a front differential, to provide all-wheel-drive The vehicle may have a vee-type hull or a cathedral type hull; and may comprise retractable suspension, with angled retraction.

21 Claims, 4 Drawing Sheets

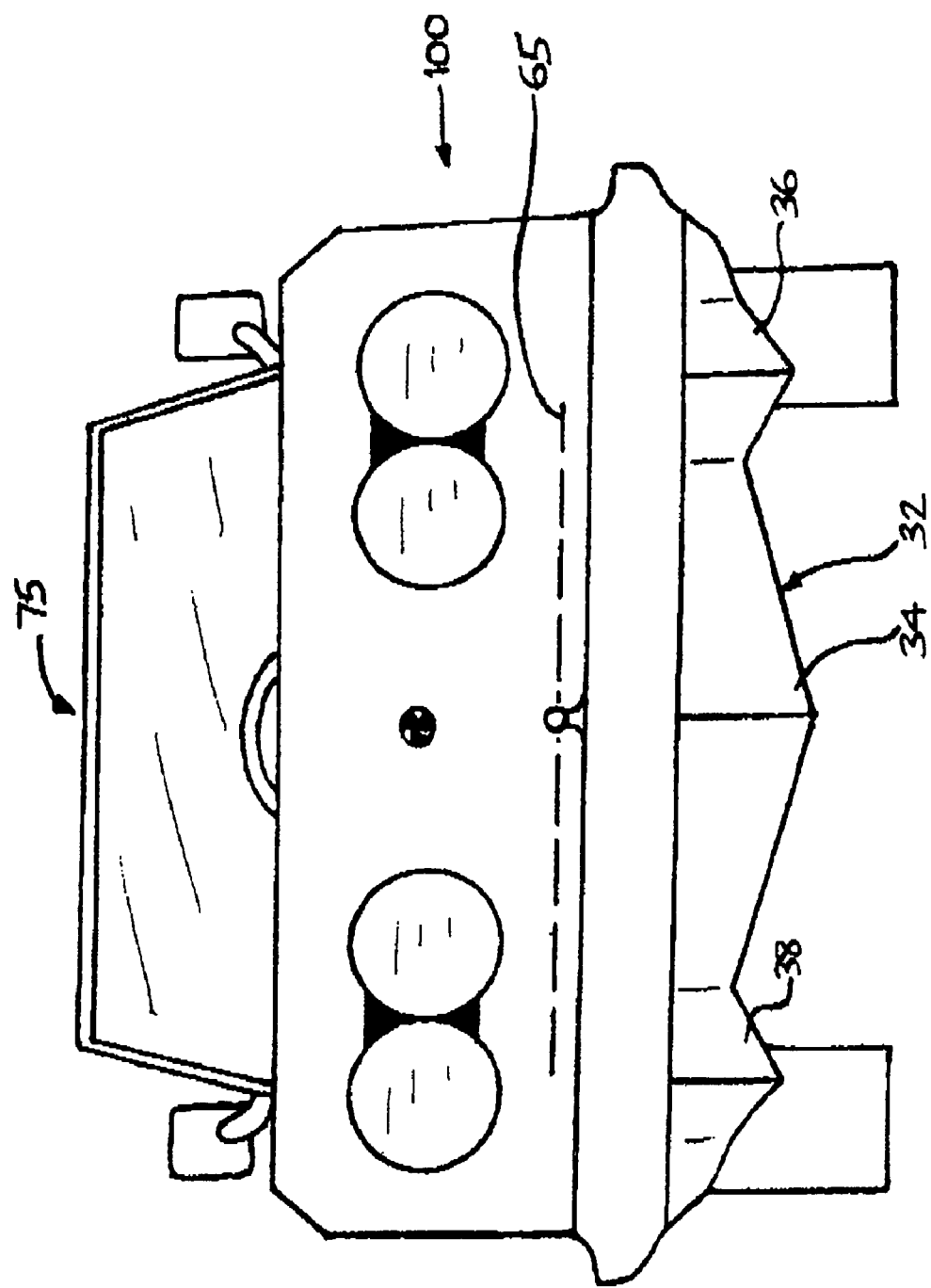

AMPHIBIOUS VEHICLE

This is a Continuation-In-Part Application of U.S. Pat. No. 10/362,490 which is the National Stage of International Application No. PCT/GB01/03773 filed Aug. 23, 2001.

BACKGROUND OF THE INVENTION

The present invention relates to an amphibious vehicle.

The phrase "sandwich power take off" or "sandwich PTO" as used herein refers to a power take off which is positioned between, and separates, the engine and a speed change transmission in a power train. Such a power take off is driven by an engine main output shaft, typically a crankshaft; and drives a transmission input shaft.

In an amphibious vehicle, particularly a planing amphibious vehicle, it is advantageous to use a power train in which an engine and transmission are positioned towards the rear of the vehicle. The weight of the power train is therefore positioned towards the back of the vehicle, which is necessary for good vehicle performance when the vehicle is in marine mode. Furthermore, the position of the power train maximises the space available towards the front of the vehicle for the passenger compartment.

A power train is disclosed for use in an amphibious military personnel carrier in U.S. Pat. No. 5,752,862 (Mohler). The disclosed power train uses a rear mounted engine and a combined transmission and differential mounted at the front of the vehicle. Although Mohler uses the drive shafts from the differential to drive caterpillar tracks, such drive shafts could also be used to provide drive to the front road wheels of a civilian amphibious vehicle. However, the power train arrangement disclosed in Mohler has several disadvantages for application to such a civilian vehicle. First, the location of the transmission at the front of the vehicle may reduce passenger and/or luggage space. Secondly, the arrangement requires a propeller shaft running through the passenger area. This shaft, which carries full engine power and rotates at engine speed, takes up valuable passenger space and will generate noise. Third, front wheel drive is not an optimal solution for a rear engined vehicle, as traction will not be as good as if the engine weight is placed over the driven wheels. This can give problems for example in take-off on slippery surfaces, and unusual on-road handling characteristics.

Other power train arrangements for use in an amphibious vehicle are known from U.S. Pat. No. 5,590,617 (Aquastrada) and U.S. Pat. No. 3,765,368 (Asbeck). In these power trains an engine and transmission are connected end-to-end in conventional automotive rear wheel drive fashion, but with the overall arrangement reversed to drive the front wheels. As can be seen particularly clearly from Aquastrada, this forces the passenger seating area towards the front of the vehicle, followed by a long rear deck area, which cannot be used for passenger or luggage space.

U.S. Pat. No. 2,350,037 (Hofheins et al) describes an amphibious vehicle in which an engine drives an output shaft by way of a transmission unit. A marine propulsion propeller is driven through a drive shaft which has an operative connection with a take-off shaft projecting from the transmission unit. A clutch for controlling driving engagement to the take-off shaft is also provided. However, the power take-off in Hofheins is not positioned between the engine and transmission and is not a sandwich power take-off, and cannot therefore transmit as much power. Hofheins also has the disadvantage that due to the relative positioning of the components, the shaft to the propeller has to slope downwards when the propeller is in use; but must be withdrawn into the vehicle when not in use. The drawbacks of this layout include the complication of an additional clutch unit, and the fact that the universal joints run at a constant angle when the propeller is in use, leading to vibration and shortened service lives. Where a shaft passing through a hull moves up and down, flexible seals must be provided, which will need maintenance; and water seepage into the hull will inevitably occur.

SUMMARY OF THE INVENTION

It is an object of the invention to resolve problems in packaging and traction in the prior art solutions, reducing the lengthwise space taken up by the power train. Further objects of the invention include provision of a robust and simple power amphibious vehicle power train, where the power transmitted to the marine propulsion unit is maximized.

According to a first aspect, the present invention provides an amphibious vehicle having a power train comprising an engine; an inline transmission; and a power take off; wherein the power take off is located forward of the engine between the engine and the transmission thereby separating the engine and the transmission; said power take off is adapted to transfer drive to a marine propulsion unit located at the rear of the amphibious vehicle by means of a drive shaft; and the output from the transmission is adapted to transfer drive to a differential located at the rear of the amphibious vehicle.

The differential is preferably located rearward of the engine.

In a preferred embodiment of a power train according to the invention, the output from the power take off is in the form of an output shaft which is connected to a drive shaft which runs below or through the oil sump of the engine, or alongside the engine. The oil sump of the engine may have a tunnel or recess through which the drive shaft passes.

In a further preferred embodiment of a power train according to the invention, the power take off is adapted to transfer drive to a marine propulsion unit located substantially in line with the engine and the transmission.

Preferably, the output from the transmission is transferred to the rear differential through a transfer case. In addition to driving the rear differential, the transfer case may also drive a differential located towards the front of the vehicle for driving the front wheels of the vehicle. This arrangement enables a four wheel drive facility when the vehicle is operated in land mode.

A marine drive decoupler may be provided so that drive to the marine propulsion unit can be selectively decoupled.

According to a further aspect, the present invention provides an amphibious vehicle having a power train comprising: an engine having an oil sump connected to a lower portion of the engine; an in-line transmission; and a power take off; wherein: the power take off is located between the engine and the transmission thereby separating the engine and the transmission; said power take off is adapted to transfer drive to a marine propulsion unit located at the rear of the amphibious vehicle by means of a drive shaft; the output from the transmission is adapted to transfer drive to a differential located at the rear of the amphibious vehicle; and said drive shaft runs below the oil sump of the engine.

According to a still further aspect, the present invention provides an amphibious vehicle having a power train comprising: an engine having an oil sump connected to a lower portion of the engine; an in-line transmission; and a power take off; wherein: the power take off is located between the engine and the transmission thereby separating the engine and the transmission; said power take off is adapted to transfer drive to a marine propulsion unit located at the rear of the amphibious vehicle by means of a drive shaft; the output from the transmission is adapted to transfer drive to a differential located at the rear of the amphibious vehicle; and said drive shaft runs through the oil sump of the engine.

According to a still further aspect, the present invention provides an amphibious vehicle having a power train comprising: an engine; an in-line transmission; and a power take off; wherein: the power take off is located between the engine and the transmission thereby separating the engine and the transmission; said power take off is adapted to transfer drive to a marine propulsion unit located at the rear of the amphibious vehicle by means of a drive shaft; the output from the transmission is adapted to transfer drive to a differential located at the rear of the amphibious vehicle; and said drive shaft runs alongside the engine.

According to a still further aspect, the present invention provides an amphibious vehicle having a south-north power train comprising: an engine; an in-line transmission; and a power take off; wherein: the power take off is located between the engine and the transmission thereby separating the engine and the transmission; said power take off is adapted to transfer drive to a marine propulsion unit located at the rear of the amphibious vehicle by means of a drive shaft; and the output from the transmission is adapted to transfer drive to a differential located at the rear of the amphibious vehicle.

BRIEF DESCRIPTION OF THE DRAWINGS

The invention will now be described, by way of example, with reference to the following drawings in which:

FIG. 5 is a front view of a preferred form of an amphibious vehicle, according to the present invention.

DETAILED DESCRIPTION OF THE PREFERRED EMBODIMENT

Figure 1:
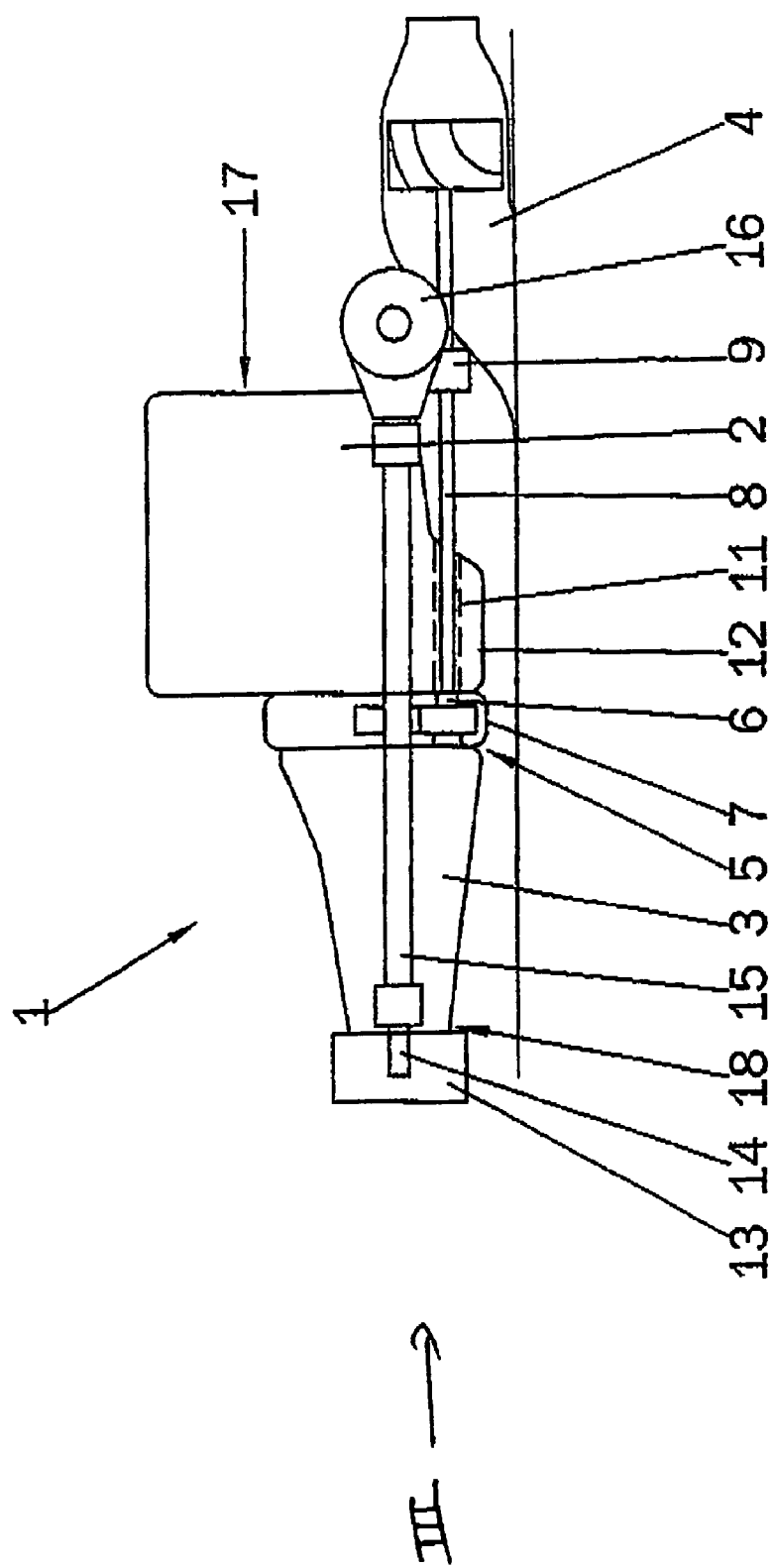
FIG. 1 is a side view of a first embodiment of a power train for an amphibious vehicle in accordance with the invention, in which drive is provided to the rear wheels only.

Referring first to FIG. 1, this shows a power train 1 for an amphibious vehicle. The power train comprises an engine 2, a transmission 3 forwardly of the engine, and a water jet 4 arranged towards the rear of the vehicle, the respective centre line of each being located substantially along the centre line of the amphibious vehicle. The transmission may comprise a manual, sequential shift, semi-automatic, or automatic gearbox, or a continuously variable transmission (CVT).

This arrangement is known generally as a "South-North" power train.

The term "South-North" will be understood by those skilled in the art to indicate a vehicle power train in which the engine is mounted so that the axis of the crankshaft is in alignment with or parallel to the axis of the vehicle and in which the front end of the engine, usually the timing end, faces towards the rear of the vehicle. The term should be interpreted in this sense throughout the description and/or claims.

A power take off 5, known as a sandwich power take off, is located between the engine 2 and the transmission 3 and has an output shaft 6 driven by engine 2, and is enclosed by a chain case 7. The power take off may be of any suitable type and may, for example, be constructed according to the applicant's European Patent number 1,311,403 B1.

The output shaft 6 of the power take off is coupled to a drive shaft 8 which runs rearward to a marine propulsion unit 4. As shown in FIG. 1, the marine propulsion unit is a water jet, but a screw propeller or any other suitable marine propulsion system may be employed. A decoupler 9 is provided in the drive line from the power take off to the marine propulsion unit so that drive to the marine propulsion unit can be selectively coupled and decoupled. However, such a marine drive decoupler is not essential and can be omitted. An advantage of the jet drive over a propeller drive is that the jet is contained within the hull profile. As it sucks water in through an intake in the bottom of the hull, it does not need to be lowered into the water to generate thrust. Conversely, it does not have to be lifted out of the water for the jet blades to clear the ground when driving on land. This means the marine propulsion unit drive shaft can be fixed at one constant angle relative to the power take off, avoiding the need for a shaft lifting device as described in prior art; and any joints in the drive shaft (which are usually provided in case of misalignment due to tolerance build-up in series production, or any other misalignment) will be driven with their input and output parallel or close to parallel, minimizing noise, vibration, and power loss; and maximizing service life.

A drawback of this sandwich type PTO is that as the engine crankshaft only rotates in one direction, drive to the marine propulsion unit, in this case a jet drive, cannot be reversed. Hence, a reversing bucket must be added to the jet drive to allow the vehicle to reverse on water. Reversing buckets are well known in marine engineering, hence the bucket is neither shown in the figures nor described. It is useful to be able to reverse a jet drive in order to flush out any weeds or debris which have got past the intake weed grating or stone guard and clogged the rotor. Nonetheless, a sandwich PTO as illustrated has the advantage that it is the most mechanically efficient form of power take off; very little engine power is lost in transmission. This helps to optimize the amphibious vehicle's performance on water.

In the embodiment shown in FIG. 1, the drive shaft 8 for the marine propulsion unit runs in a tunnel 11 through the oil-sump 12 of the engine 2. Alternatively, the drive shaft may run below the oil-sump or beside the oil-sump, on whichever side of the engine may be convenient, or alongside the engine with the marine propulsion unit located accordingly. Tunnel 11 may be fully enclosed as shown, or in the form of a recess in the sump, which recess is open at its base.

The transmission 3 is of a conventional longitudinal type. The drive or output end 18 of the transmission is connected to a transfer case 13 which transfers drive power from the transmission 3 to an output shaft 14. The output shaft 14 is connected by a drive shaft 15 to a differential 16, which is located between the timing end 17 of the engine 2 and the marine propulsion unit 4 at the rear of the vehicle. The differential 16 transmits drive to the rear wheels of the amphibious vehicle via axle shafts in conventional automotive manner.

Although not shown in FIG. 1, the transfer case 13 may comprise a driving sprocket rotatably fast with an output shaft of the transmission, and a driven sprocket rotatably fast with the output shaft 14 of the transfer case 13, drive being transmitted between the two sprockets by means of a chain or belt.

Figure 2:
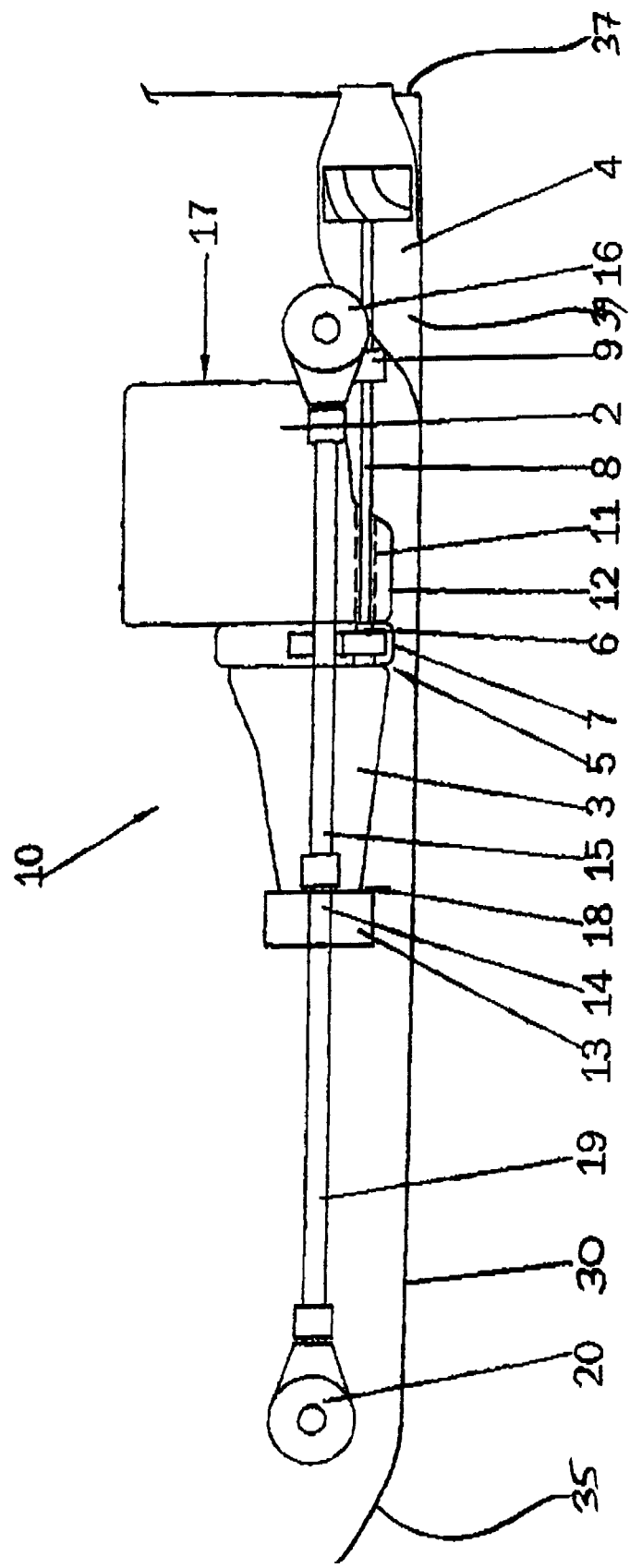
FIG. 2 is a side view of a second embodiment of a power train for an amphibious vehicle in accordance with the invention, in which drive is provided to front and rear wheels.

A second embodiment of the invention will now be described with reference to FIG. 2 in which common reference numerals are used to denote parts in common with the embodiment shown in FIG. 1. The power train 10 is essentially the same as the power train 1 shown in FIG. 1, the only difference being that the transfer case 13 also provides drive to the front wheels of the vehicle by means of a forward drive shaft 19 and differential 20. A center differential (not shown) may also be provided in or adjacent to the transfer case 13. FIG. 2 also shows hull 30, with bow 35 suitable for a planing vessel, stern 37, and jet drive intake 39.

Figure 3:
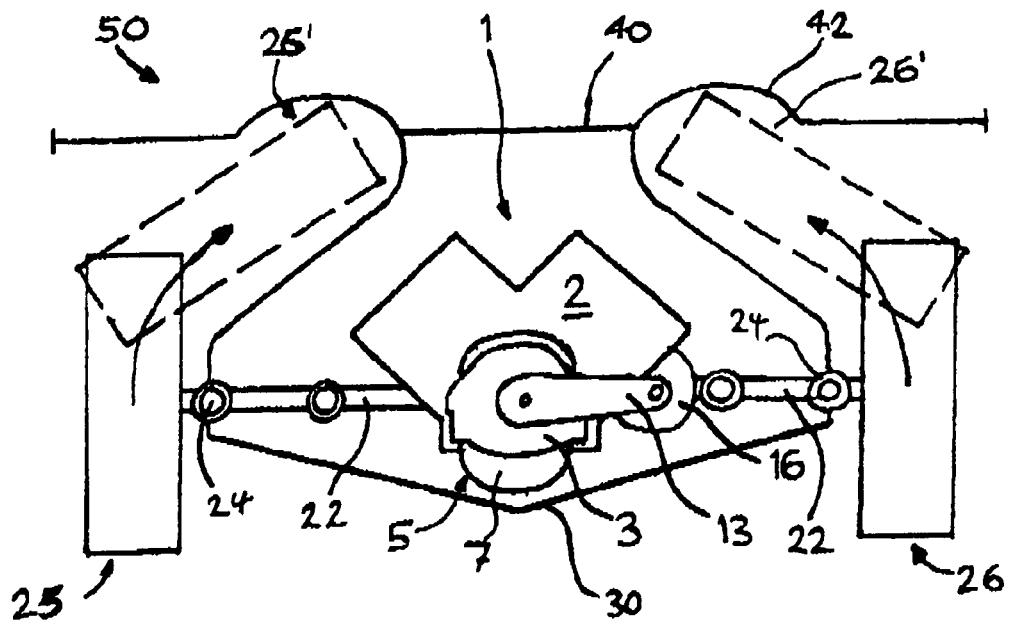
FIG. 3 is a view in the direction of arrow III of FIG. 1, showing the power train of FIG. 1 mounted in an amphibious vehicle.

Referring now to FIG. 3, this is a view of the power train of FIG. 1, in the direction of arrow III of FIG. 1, showing the power train mounted in an amphibious vehicle 50. Only a portion of the inner structure of the vehicle is shown for clarity.

The differential 16 is coupled through driveshafts 22 and constant velocity (CV) joints 24 to road wheels 26, drive being transmitted from the differential 16 to the road wheels through the drive shafts and CV joints. The CV joints may be arranged according to co-pending application WO 04/039614, the contents of which are incorporated herein by reference.

A retractable suspension (not shown in the drawings) may be fitted to the vehicle to enable the road wheels 26 to be moved between their extended, road positions, shown in solid lines in FIG. 3 and the retracted, marine positions 26', shown in dashed lines.

The suspension may be arranged according to the applicant's patent, U.S. Pat. RE. No. 36,901.

As can be seen from FIG. 3, the hull is a Vee-type hull 30, which provides efficient planing over water and has other advantages. As can be seen from FIG. 3, the depression at the centre of the hull 30 allows the power train 1 to be set relatively low in the vehicle, allowing a low centre of gravity and metacentric height (as discussed in the applicant's co-pending application U.S. Pat. No. 2004/0014372 A1) to optimise handling on both land and water. The vehicle is generally indicated at 50 in FIG. 3, and includes an engine cover panel 40. The cover panel in turn includes blisters 42 to allow stowage of road wheels 26 when in their retracted, marine position.

Figure 4:
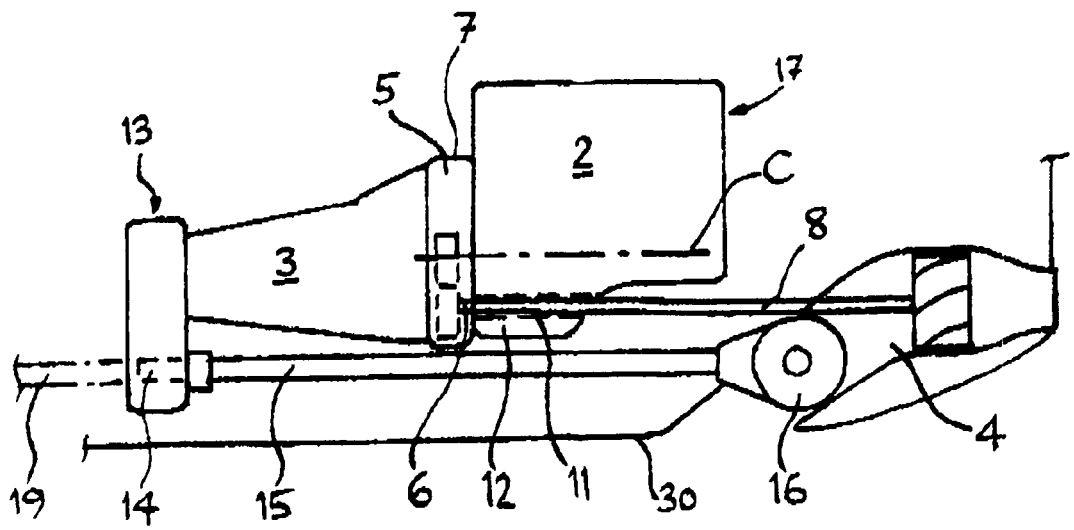
FIG. 4 is a side view of a third embodiment of a power train for an amphibious vehicle, in accordance with the invention.

Referring now to FIG. 4, this is a view similar to that of FIGS. 1 and 2 showing a side view of a third embodiment of power train for an amphibious vehicle, in accordance with the present invention. Like parts are given like reference numbers.

In FIG. 4, the transfer case 13 is rotated compared with that of FIGS. 1 and 2 into a vertical or near vertical orientation, such that the drive shaft 15 runs from the transfer case 13 beneath the transmission 3, power take off 5 and engine 2, to drive the wheel differential 16. This arrangement provides a deeper but narrower power train layout, which may be preferred for packaging reasons. For example, this arrangement enables the differential 16 to be placed closer to the longitudinal centre line of the vehicle. This reduces the angles through which the CV joints 24 must articulate to allow retraction of the road wheels 26 from the road position to the marine position.

The engine crankshaft axis is shown in FIG. 4 in chain line at C. The crankshaft drives the power take off which is driven at a fixed multiple of the engine speed, usually 1:1.

The embodiment of FIG. 4 may also be provided with a front differential drive shaft 19, as shown in chain lines, similar to the embodiment of FIG. 2.

The power train of FIG. 4 may also be provided in a Vee-shaped hull 30.

FIG. 5 is a front view of a preferred form of amphibious vehicle 100 according to the invention, in which a cathedral-type hull 32 is used. This has a central Vee section 34 and two outlying Vee sections 36, 38. The advantages of this particular type of hull are described in the applicant's co-pending application No. GB 0411546.5. In use, when the hull achieves sufficient through water speed, the resulting hydrodynamic lift causes the hull to rise out of the water and onto the plane. In this condition the forward bow end of the hull lifts clear of the surface of the water and only the rearward planing surface of the hull remains in contact with the water, albeit on the surface only. The planing surface of the vehicle is thus constituted by the hull surface towards the rear of the vehicle, typically the portion of the hull extending rearwardly from a point one third of the way along the length of the vehicle from bow to stern.

In order for the vehicle to make the transition from its hull being fully displaced and being non-displaced, i.e. planing, the through water speed of the vehicle must be increased to achieve the necessary hydrodynamic lift. The triple V sections 34, 36, 38 are key in reducing the drag of the hull and facilitating the necessary gain in speed of the vehicle. Once on the plane, the V sections 34, 36, 38 provide directional stability. However, these V sections 34, 36, 38 may be supplemented with strakes as discussed in the applicant's co-pending UK patent application no. GB 2401833. Furthermore, planing plates may be beneficially employed as described in the applicant's co-pending UK patent application no. GB 2401832.

It is particularly advantageous to combine the cathedral-type hull as shown in FIG. 5 with the differential drive shaft or drive shafts mounted low in the hull as shown in FIG. 4. This allows a low and level interior floor 65 (FIG. 5), whilst the absence of a central transmission tunnel allows a central driving position 75 to be adopted.

Such a central driving position provides advantages of driver visibility on water, particularly when combined with a tip-up drivers seat, as is discussed in U.S. Pat. No. 6,883,457 B2. In addition, it also saves manufacturing tooling costs, since it is not necessary to provide different versions of the same vehicle for left hand and right hand drive markets.

What is claimed is:

1. An amphibious vehicle having a power train comprising:
   an engine;
   an in-line transmission;
   and a power take off;
   wherein:
   the power take off is located forward of the engine between the engine and the transmission thereby separating the engine and the transmission;
   said power take off is adapted to transfer drive to a marine propulsion unit located at the rear of the amphibious vehicle by means of a drive shaft;

and the output from the transmission is adapted to transfer drive to a differential located at the rear of the amphibious vehicle.

2. An amphibious vehicle as claimed in claim 1 having an oil sump connected to a lower portion of the engine and wherein said drive shaft runs below the oil sump of the engine.

3. An amphibious vehicle as claimed in claim 1 having an oil sump connected to a lower portion of the engine and wherein said drive shaft runs through the oil sump of the engine.

4. An amphibious vehicle as claimed in claim 1 wherein said drive shaft runs alongside the engine.

5. An amphibious vehicle as claimed in claim 1 wherein:
  the power take off has an output shaft coupled at one end to the drive shaft;
  the power take off and the output shaft are housed in a chain case;
  and the chain case spaces the transmission from the engine.

6. An amphibious vehicle as claimed in claim 5 having an oil sump connected to a lower portion of the engine and wherein a portion of the drive shaft is fully enclosed in a tunnel through the oil sump pump.

7. An amphibious vehicle as claimed in claim 5 wherein a drive line to the marine propulsion unit comprises the output shaft and the drive shaft, and a decoupler is provided in the drive line from the power take off to the marine propulsion unit for selectively coupling and decoupling drive to the marine propulsion unit.

8. An amphibious vehicle as claimed in claim 1, in which the differential is located rearward of the engine.

9. An amphibious vehicle as claimed in claim 1 having an oil sump connected to a lower portion of the engine and in which the output from the power take off is in the form of an output shaft which is connected to the drive shaft which runs below or through the oil sump of the engine or alongside the engine.

10. An amphibious vehicle as claimed in claim 1, in which the marine propulsion unit is located in line with, or substantially in line with, the engine and the transmission.

11. An amphibious vehicle as claimed in claim 1, in which the output from the transmission is transferred to the differential through a transfer case.

12. An amphibious vehicle as claimed in claim 11, in which the transfer case is adapted to drive a further differential located toward the front of the vehicle for driving the front wheels of the vehicle.

13. An amphibious vehicle as claimed in claim 1, in which a decoupler is provided such that drive to the marine propulsion unit can be selectively coupled and decoupled.

14. An amphibious vehicle as claimed in claim 1, in which the engine is adapted to be mounted in the vehicle such that a crankshaft of the engine is substantially in alignment with the central longitudinal axis of the vehicle and with the front or timing end of the engine facing the rear of the vehicle.

15. An amphibious vehicle as claimed in claim 1 wherein the output from the transmission is adapted to transfer drive to said differential located at the rear of the amphibious vehicle by way of a drive shaft which runs below the engine.

16. An amphibious vehicle as claimed in claim 1 having a Vee-type hull.

17. An amphibious vehicle as claimed in claim 1 having a cathedral hull.

18. An amphibious vehicle having a power train comprising:
  an engine having an oil sump connected to a lower portion of the engine;
  an in-line transmission;
  and a power take off;
  wherein:
  the power take off is located between the engine and the transmission thereby separating the engine and the transmission;
  said power take off is adapted to transfer drive to a marine propulsion unit located at the rear of the amphibious vehicle by means of a drive shaft;
  the output from the transmission is adapted to transfer drive to a differential located at the rear of the amphibious vehicle;
  and said drive shaft runs below the oil sump of the engine.

19. An amphibious vehicle having a power train comprising:
  an engine having an oil sump connected to a lower portion of the engine;
  an in-line transmission;
  and a power take off;
  wherein:
  the power take off is located between the engine and the transmission thereby separating the engine and the transmission;
  said power take off is adapted to transfer drive to a marine propulsion unit located at the rear of the amphibious vehicle by means of a drive shaft;
  the output from the transmission is adapted to transfer drive to a differential located at the rear of the amphibious vehicle;
  and said drive shaft runs through the oil sump of the engine.

20. An amphibious vehicle having a power train comprising:
  an engine;
  an in-line transmission;
  and a power take off;
  wherein:
  the power take off is located between the engine and the transmission thereby separating the engine and the transmission;
  said power take off is adapted to transfer drive to a marine propulsion unit located at the rear of the amphibious vehicle by means of a drive shaft;
  the output from the transmission is adapted to transfer drive to a differential located at the rear of the amphibious vehicle;
  and said drive shaft runs alongside the engine.

21. An amphibious vehicle having a south-north power train comprising:
  an engine;
  an in-line transmission;
  and a power take off;
  wherein:
  the power take off is located between the engine and the transmission thereby separating the engine and the transmission;
  said power take off is adapted to transfer drive to a marine propulsion unit located at the rear of the amphibious vehicle by means of a drive shaft;
  and the output from the transmission is adapted to transfer drive to a differential located at the rear of the amphibious vehicle.

* * * * *

UNITED STATES PATENT AND TRADEMARK OFFICE
CERTIFICATE OF CORRECTION

| | | |
|---|---|---|
| PATENT NO. | : 7,214,112 B2 | Page 1 of 1 |
| APPLICATION NO. | : 11/134953 | |
| DATED | : May 8, 2007 | |
| INVENTOR(S) | : Alan Timothy Gibbs | |

It is certified that error appears in the above-identified patent and that said Letters Patent is hereby corrected as shown below:

On Title Page, item (73) Assignee name should be changed, "Gibbs Technologies Limited (IM)" should be changed to --Gibbs Technologies Limited (Isle of Man, United Kingdom)--.

Column 1, line 1 "U.S. Pat. No." should read --U.S. Pat. Application No.--.

Column 4, line 3 "tern" should read --term--.

Column 5, line 47 "U.S. Pat. No." should read --U.S. Pat. Publication No.--.

Signed and Sealed this

Thirty-first Day of July, 2007

JON W. DUDAS
*Director of the United States Patent and Trademark Office*